United States Patent
Yahagi (10) Patent No.: US 7,561,284 B2
(45) Date of Patent: Jul. 14, 2009

(54) SETUP SUPPORTING SYSTEM FOR SUPPORTING SETUP OF ELECTRONIC DEVICE

(75) Inventor: Koichi Yahagi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 994 days.

(21) Appl. No.: 10/983,648

(22) Filed: Nov. 9, 2004

(65) Prior Publication Data

US 2005/0140794 A1 Jun. 30, 2005

(30) Foreign Application Priority Data

Nov. 11, 2003 (JP) ............................. 2003-381565

(51) Int. Cl.
*G06F 3/12* (2006.01)
*H04N 1/00* (2006.01)
(52) U.S. Cl. ..................... 358/1.13; 358/1.15; 358/1.6
(58) Field of Classification Search .................. 358/1.1, 358/1.2, 1.6, 1.9, 1.13, 1.14, 1.15, 1.16, 1.17, 358/1.18, 400, 407, 468; 348/211.2, 207.99; 283/85; 340/10.41, 539.1
See application file for complete search history.

(56) References Cited

U.S. PATENT DOCUMENTS

2007/0205874 A1* 9/2007 Tokkonen et al. ........ 340/10.41

FOREIGN PATENT DOCUMENTS

JP 2003-116127 4/2003

* cited by examiner

*Primary Examiner*—Dov Popovici
(74) *Attorney, Agent, or Firm*—Birch, Stewart, Kolasch & Birch, LLP (57) ABSTRACT

A digital still camera includes a mode selection key for setting a selected one of plural operation modes. A setup mode is included in the operation modes. An input key is incorporated in the digital still camera, for inputting at least one setup parameter while the setup mode is set. A printed manual document is associated with the digital still camera, and has plural document pages. Each of the document pages has mode information of the setup mode as explained information. An RFID tag is secured to the printed manual document, for storing the mode information. An RFID tag reader is incorporated in the digital still camera, for reading the mode information of the setup mode from the RFID tag, to set the setup mode forcibly irrespective of setting of the mode selection key.

16 Claims, 4 Drawing Sheets

SETUP SUPPORTING SYSTEM FOR SUPPORTING SETUP OF ELECTRONIC DEVICE

BACKGROUND OF THE INVENTION

1. Field of the Invention

The present invention relates to a setup supporting system for supporting setup of an electronic device. More particularly, the present invention relates to a setup supporting system for supporting setup of an electronic device, in which the setup can be easy particularly for the electronic device having a display panel.

2. Description Related to the Prior Art

Electronic devices, such as a digital still camera, are widely used. According to quick innovation in the electronic field, the handling of the electronic device has become much easier. However, the electronic device is still considerably difficult to handle typically to unfamiliar users, such as aged persons, unskilled persons and the like. When a user purchases a digital still camera, he or she must view a manual document before using the digital still camera for exposures, and set up various parameters for the present date and image quality with which an image is adjusted if desired.

JP-A 2003-116127 discloses an example of RFID (radio frequency identification) tag system in use. An article is carried manually with the user. When he or she enters a particular room, space or region for photographic use, an RFID (radio frequency identification) tag, disposed on the article and moved with him or her, is automatically detected according to electromagnetic information emitted thereby, so as to photograph an image of the user as a specifically designated object. Furthermore, the digital still camera, as the electronic device in a small size which cannot be provided with a wireless data communication device such as wireless LAN (trade name), is loaded with the RFID tag as a communication terminal. This makes it possible to read the device information of the electronic device.

The RFID tag system in which the RFID tag is used is a widely used form of the wireless data communication device. The RFID tag system consists of the RFID tag and an RFID (radio frequency identification) tag reader connected with a host computer. A radio wave or electromagnetic wave in a wavelength range of microwave is transmitted by the RFID tag reader, and received by the RFID tag to respond. Structurally, the RFID tag is constituted by an antenna, and an IC memory chip or identification storage medium. The antenna receives the radio wave from, and transmits the radio wave to, the RFID tag reader. The identification storage medium operates by means of power supplied by the radio wave from the antenna, and outputs information by reading of the stored information therein.

For the user to set up the digital still camera, a setup menu pattern is displayed on a display panel of the digital still camera to input parameters. However, the digital still camera according to a known product is constructed with so deeply layered routines that the user must follow the sequence for exactly reading the setup menu pattern without errors. Explanations for the sequence in the manual document are considerably long. Unfamiliar users, such as aged persons, unskilled persons and the like, are likely to give up handling the digital still camera due to apparently difficult operation.

Similar problems remain in other electronic devices other than the digital still camera. A display panel for displaying the setup menu pattern is used for inputting parameters. However, processes for displaying the setup menu pattern are found very difficult.

SUMMARY OF THE INVENTION

In view of the foregoing problems, an object of the present invention is to provide a setup supporting system for supporting setup of an electronic device, in which the setup can be easy particularly for the electronic device having a display panel.

In order to achieve the above and other objects and advantages of this invention, a setup supporting system for supporting setup of an electronic device is provided, in which electronic device plural operation modes are selectively settable, and include a setup mode for plural setup parameters. The electronic device includes a display panel for displaying a setup menu pattern associated with one of the plural setup parameters while the setup mode is set. The setup supporting system includes a printed document, including information of the setup of the plural setup parameters. An RFID tag is secured to the printed document, associated with the setup parameters, for storing the mode information of the setup mode. An RFID tag reader reads the mode information from the RFID tag. A mode selector sets the setup mode. A display pattern selector causes the display panel to display the setup menu pattern associated with the one setup parameter according to the mode information.

In a preferred embodiment, a setup supporting system for supporting setup of an electronic device is provided. A mode selector is incorporated in the electronic device, for setting a selected one of plural operation modes, wherein at least one setup mode is included in the operation modes. An input unit is incorporated in the electronic device, for inputting at least one setup parameter while the setup mode is set. A printed document is associated with the electronic device, has plural document sections, wherein a first document section is included in the document sections, and has visible mode information of the setup mode. An RFID tag is secured to the printed document, for storing mode information of the setup mode. An RFID tag reader is incorporated in the electronic device, for reading the mode information from the RFID tag, to set the setup mode forcibly irrespective of selection of the operation modes in the mode selector.

Furthermore, a display panel is secured to the electronic device, for displaying a setup menu pattern according to the setup mode, and for being used to input the setup parameter, the display panel being controlled according to an output of the mode selector and the RFID tag reader.

The printed document is a printed manual document, and the document sections comprise document pages or document sheets.

The RFID tag reader is disposed on a lower face of the electronic device.

The electronic device comprises a digital camera. The digital camera includes a tripod connection hole formed in the lower face thereof, and adapted for tripod connection, the RFID tag reader being disposed inside the tripod connection hole.

Furthermore, at least one first indicia is disposed on a lateral face of the electronic device, for designating a position of the RFID tag reader.

The first document section further includes a second indicia for positioning the first indicia thereon, to set the RFID tag reader at the RFID tag.

The first document section is placed to extend substantially horizontally, so as to direct the visible mode information in a readable orientation suitable for being read. The RFID tag is disposed higher than the visible mode information with reference to the readable orientation.

The electronic device is set on the first document section by directing the display panel downwards with reference to the readable orientation, to keep the display panel observable together with the visible mode information.

The first document section further includes a positioning region, disposed beside the visible mode information to extend about the RFID tag, for positioning an outer surface of the electronic device therein.

The first indicia is positioned between the RFID tag and the visible mode information.

The visible mode information includes explained information in verbal expression.

The visible mode information includes information in graphic or symbolic expression.

The at least one setup mode includes at least a date determining setup mode and an image quality determining setup mode.

Also, the information in graphic or symbolic expression comprises a printed form of the setup menu pattern.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
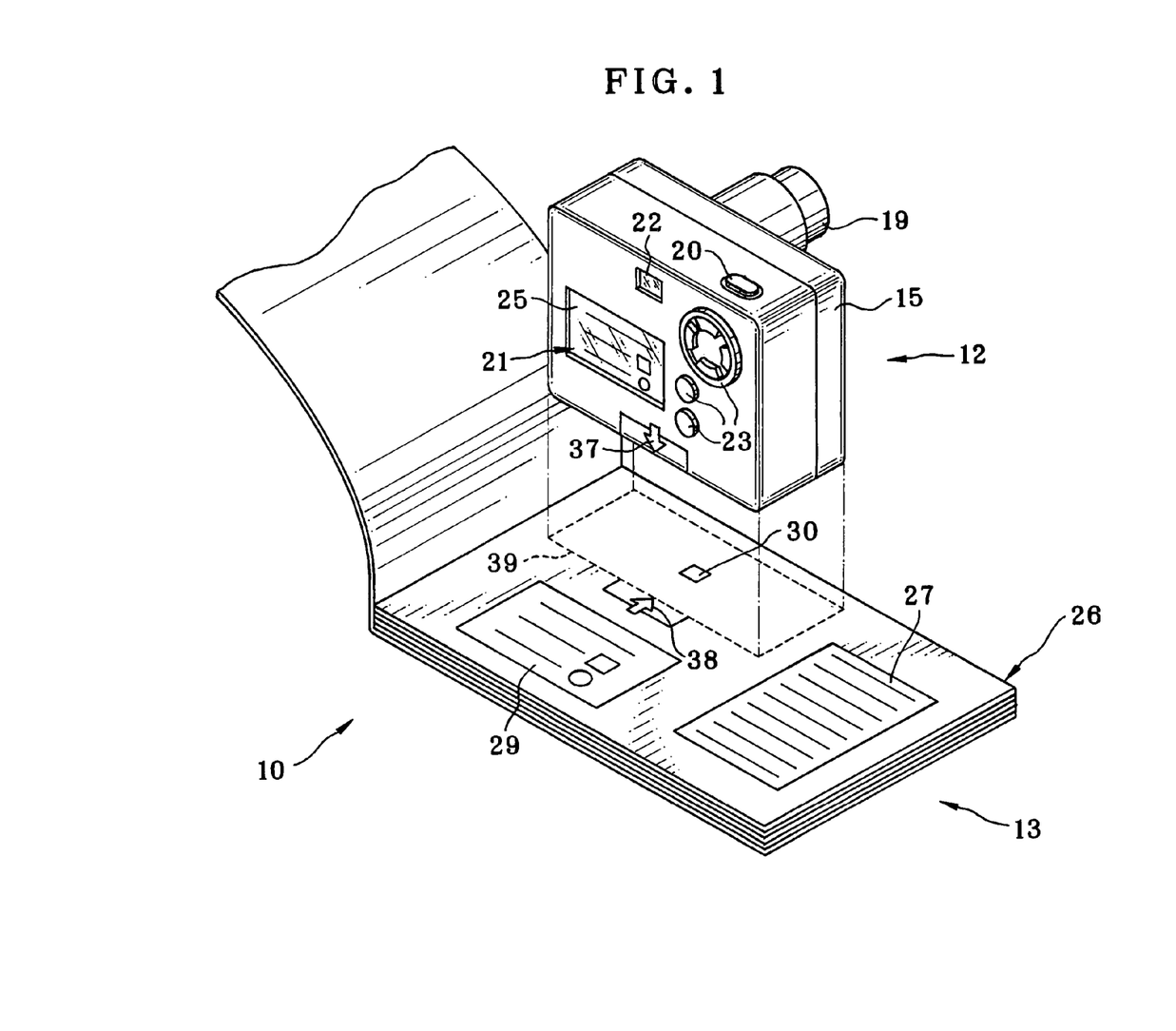
FIG. 1 is a perspective view illustrating a setup supporting system for a digital still camera.

In FIG. 1, a setup supporting system 10 for a digital still camera 12 as electronic device is illustrated. The digital still camera 12 operates to photograph an object image of an object 11, and creates image data. It is natural that the electronic device of the invention may be other than the digital still camera 12. As illustrated in FIG. 1, the setup supporting system 10 is constituted by the digital still camera 12 and a printed manual document 13. The printed manual document 13 for the digital still camera 12 carries information of a handling method for the digital still camera 12, and setup of various determining processes. A user can input parameters for conditioning of the digital still camera 12 by viewing and reading the printed manual document 13.

The digital still camera 12 includes a camera body (not shown) and a camera cover 15. The camera body contains various mechanisms for taking an exposure. The camera cover 15 covers the outside of the camera body. A front of the camera cover 15 has a lens barrel 19 constituting a taking lens, and also a flash emission window and a viewfinder objective window. An upper face of the camera cover 15 is provided with a shutter release button 20 and a power switch (not shown). A rear of the camera cover 15 is provided with a liquid crystal display panel (LCD) 21, an eyepiece viewfinder window 22, and an input panel unit 23 or key panel. The input panel unit 23 includes a mode selection key 60, an input key 62 and a cross-formed key or button 64. A lower face of the camera cover 15 has a tripod connection hole 24 with a female thread for connection of the digital still camera 12 with a tripod (not shown). For the tripod connection hole 24, see FIG. 2.

A setup menu pattern 25 is displayed on the LCD 21 for displaying images photographed through the taking lens, and displaying information for conditioning the digital still camera 12. A plurality of the setup menu patterns 25 are prepared for various parameter determining processes, for example a date determining process, an image quality determining process and the like. If the setup menu pattern 25 is for the date determination, the setup menu pattern 25 appears for indicating blank portions for inputting date, month and year, and time. If the setup menu pattern 25 is for the image quality determination, the setup menu pattern 25 appears for indicating blank portions for inputting a level of image quality. In order to effect the determination, the setup menu pattern 25 is changed over on the LCD 21 according to the method described later. The user views the setup menu pattern 25, and operates the input panel unit 23 to input parameters according to instructions for filling in the blanks and selection from a group of parameters.

The digital still camera 12 operates in at least three operation modes including a photographing mode, a playing mode and a setup mode. When the photographing mode is set, an object can be photographed. When the playing mode is set, stored images are read, displayed and checked. When the setup mode is set, one of the setup menu patterns 25 for a setup parameter is displayed on the LCD 21 for date determination, image quality determination, and the like. To change over the modes, the mode selection key 60 in the input panel unit 23 can be used for manual changes. However, an automatic changeover is used as described later in detail.

The printed manual document 13 has a form of booklet obtained by binding leaves of sheets or pages. Explained information 27 is printed, and includes descriptions of the process of setup for each group of parameters. Document pages or sheets 26 have the explained information 27 in a readable manner of verbal expression. Also, graphic information 29 is printed on the document pages 26 in a manner corresponding to the setup menu pattern 25 indicated on the LCD 21. At the time of the setup, a predetermined one of the document pages 26 is opened in the printed manual document 13. The LCD 21 of the digital still camera 12 is caused to indicate the setup menu pattern 25, because the setup menu pattern 25 is exactly read in the digital still camera 12. The user is enabled to compare the setup menu pattern 25 with the graphic information 29 in determining the parameters for chronology according to the method suggested in the explained information 27.

To determine the date in a conventional digital still camera, a setup mode is selectively set among the plural operation modes, to display an initial selection menu pattern (not shown) in the LCD 21. The date determination is selected in the selection menu pattern to display a date determining one of the setup menu patterns 25. A series of processes required for displaying the date determining pattern are manual. This series of the processes is felt considerably difficult to unfamiliar users such as aged persons, unskilled pattern or the like. In the present embodiment, the document pages or sheets 26 of the printed manual document 13 are provided with a storage storing information related to a setup parameter of which description is carried. Note that menu title information or mode information is stored by way of the information related to the setup mode to input parameters. At the time of the setup, the mode information stored in the digital still camera 12 is read, to change over the operation mode to the setup mode of the digital still camera 12. Also, one of the setup menu patterns 25 is automatically displayed on the LCD 21. As a result, it is possible to save the operation of changing over the operation mode, and to save operation of changing the setup menu patterns 25 to one another. Note that the information related to the parameters to be determined is not limited to the menu title information, and can be mode information of any suitable form with distinctness for specifying the parameters.

The storage medium for storing information of parameters to be input is preferably one having a small thickness for positioning on each of the document pages or sheets 26 of the printed manual document 13, and being adapted to reading information easily. Accordingly, an RFID (radio frequency identification) tag 30 for wireless reception and transmission of a signal is secured to each of the document pages 26, and provided with menu title information or mode information for the parameters to be input according to written information of the document pages 26. For example, a predetermined one of the document pages 26 carries information of a process of inputting a date. The RFID tag 30 is attached to the predetermined page 26, and has a title of Determining a Date. Note that, in the present embodiment, the RFID tag 30 is secured to each of the document pages 26. However, the RFID tag 30 may be fixed in other manners. For example, the RFID tag 30 may be incorporated in each of the document pages 26. To this end, the document pages 26 can be prepared in a double sheet constituted by two sheets laminated thereon.

The RFID tag 30 is an IC memory of a non-contact type with small size, and used with radio wave as carrier for wireless communication. The RFID tag 30 is constituted by an identification storage medium and an antenna. The identification storage medium stores information. The antenna receives radio wave to, and transmits ratio wave from an external device wirelessly. The RFID tag 30 according to the RFID (radio frequency identification) system for verification is a wireless communication device, and is referred also as a wireless tag. A form of the RFID tag 30 is a quadrilateral with a side line being as short as several millimeters. A thickness of the RFID tag 30 is somewhat small, and is several times as great as 1/10 millimeter. There occurs no problem of unwanted protrusion even attached to a surface of the document pages or sheets 26.

Figure 2:
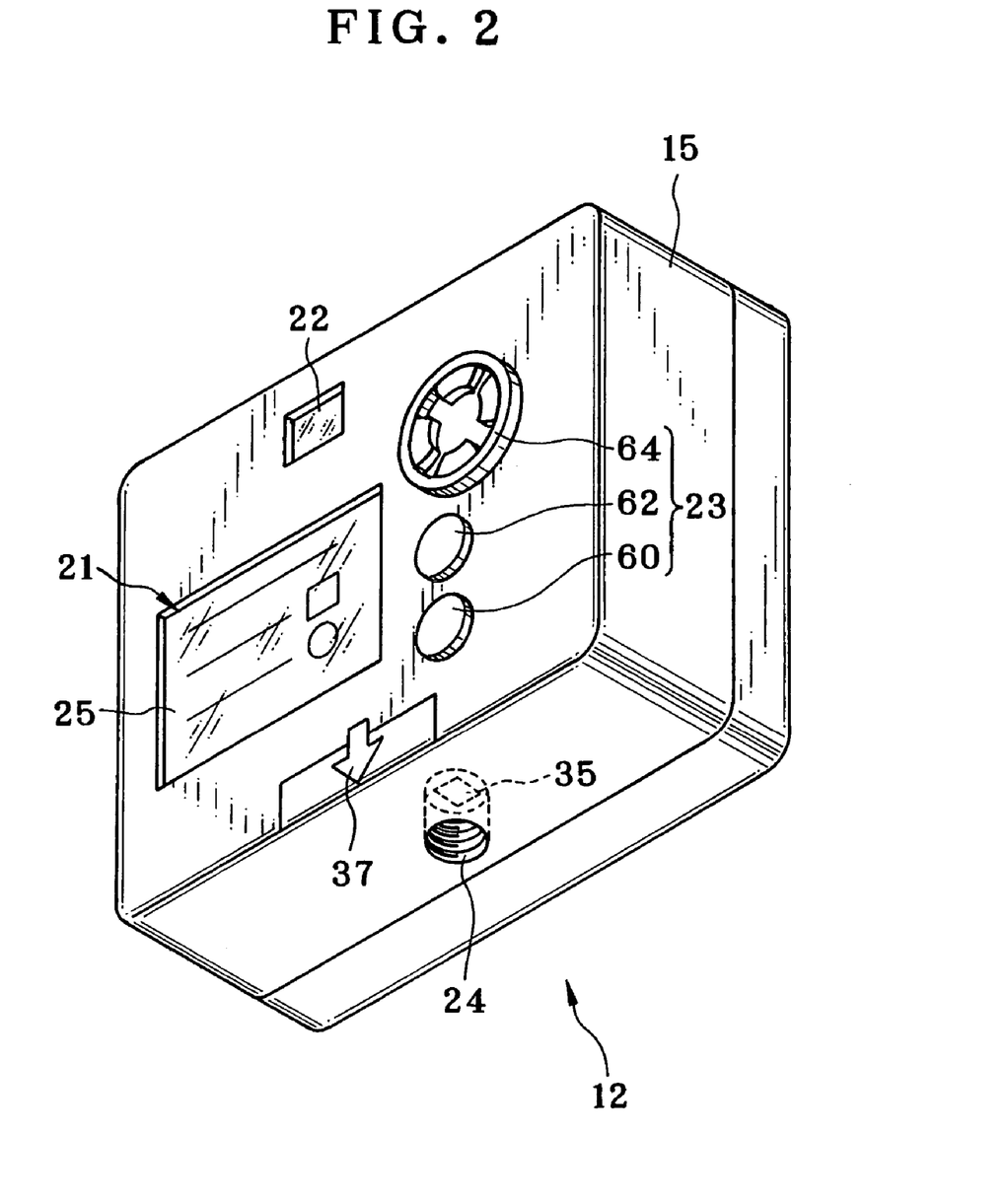
FIG. 2 is a perspective view illustrating the digital still camera.

In FIG. 2, an RFID (radio frequency identification) tag reader 35 is incorporated in the digital still camera 12, disposed on an inner surface of the tripod connection hole 24, for receiving radio wave information from the RFID tag 30 by wireless communication, to read the information. The disposition of the RFID tag reader 35 in the tripod connection hole 24 makes it unnecessary to form an opening in the camera cover 15 for reading. Also, this disposition is effective in saving a space for containing the RFID tag reader 35.

Examples of communication systems between the RFID tag 30 and the RFID tag reader 35 are microwave type, electromagnetic induction type, radio wave type and the like among various electromagnetic wave types. The distance of communication of the RFID tag 30 differs according to the system type, strength of the electromagnetic wave and the like, but is approximately is in a range from several millimeters to several tens of centimeters. A preferred example of the IC memory chip or identification storage medium is a non-volatile memory of which supply of power is unnecessary for keeping a stored state of data. Electric power required for operating the RFID tag 30 is supplied by electromagnetic wave as carrier transmitted by the RFID tag reader 35 for reading the information from the identification storage medium. Thus, the digital still camera 12 is placed on each of the document pages or sheets 26 to position the tripod connection hole 24 of the digital still camera 12 at the RFID tag 30 in a closely opposed manner. This makes it possible for the RFID tag reader 35 to read the menu title information or mode information from the RFID tag 30.

In the present embodiment, the RFID tag reader 35 is disposed on the inside of the tripod connection hole 24 of the lower face of the digital still camera 12. It is difficult for users to find the position of the RFID tag reader 35 correctly. It is difficult to place the digital still camera 12 on the document pages or sheets 26 so as to position the RFID tag reader 35 at the RFID tag 30. However, a reference indicia 37 is printed on a rear face of the digital still camera 12 for representing a position of the RFID tag reader 35 in the width direction of the camera body. This makes it possible for users to find the position of the tripod connection hole 24 and the RFID tag reader 35 in the digital still camera 12 according to the width direction.

Furthermore, a target indicia 38 and a positioning region 39 are printed on each of the document pages or sheets 26. See FIG. 1. The target indicia 38 indicates a position for setting the reference indicia 37 of the digital still camera 12 to position the RFID tag reader 35 at the RFID tag 30. The positioning region 39 is a dotted line for a position of the digital still camera 12. Thus, the RFID tag 30 can be exactly positioned at the RFID tag reader 35 by setting the reference indicia 37 at the target indicia 38, or placing the digital still camera 12 in the positioning region 39 on the document pages 26. This is effective in saving manually difficult operation for positioning. Note that the reference indicia 37 is printed on a rear face of the camera cover 15. This is useful because of easy observation of a user. However, it is possible to print the reference indicia 37 on one of lateral faces and a front face of the camera cover 15. Furthermore, the reference indicia 37 can be printed to each of all of the rear face, front face and lateral faces that are adjacent to the lower face. The reference indicia 37 on the lateral faces represents the positions of the RFID tag reader 35 in the front-to-back direction of the camera body.

As is referred to above, a range of sensitivity in reading of the RFID tag reader 35 is from several millimeters to several tens of centimeters. As the printed manual document 13 is in the form of booklet, the RFID tag reader 35 is likely to misread the menu title information or mode information stored in the RFID tag 30 of next page or any succeeding lower page. It is preferable that positions of the RFID tag 30 should be offset from one another between the document pages or sheets 26. Also, an electromagnetic wave shielding sheet or film can be attached to the back surface of the document pages 26 for shielding the electromagnetic wave from the RFID tag reader 35. Moreover, such a shielding sheet or film may be embedded in each of the document pages 26. This is effective in preventing errors in reading of the RFID tag reader 35 or crosstalk of radio waves.

Figure 3:
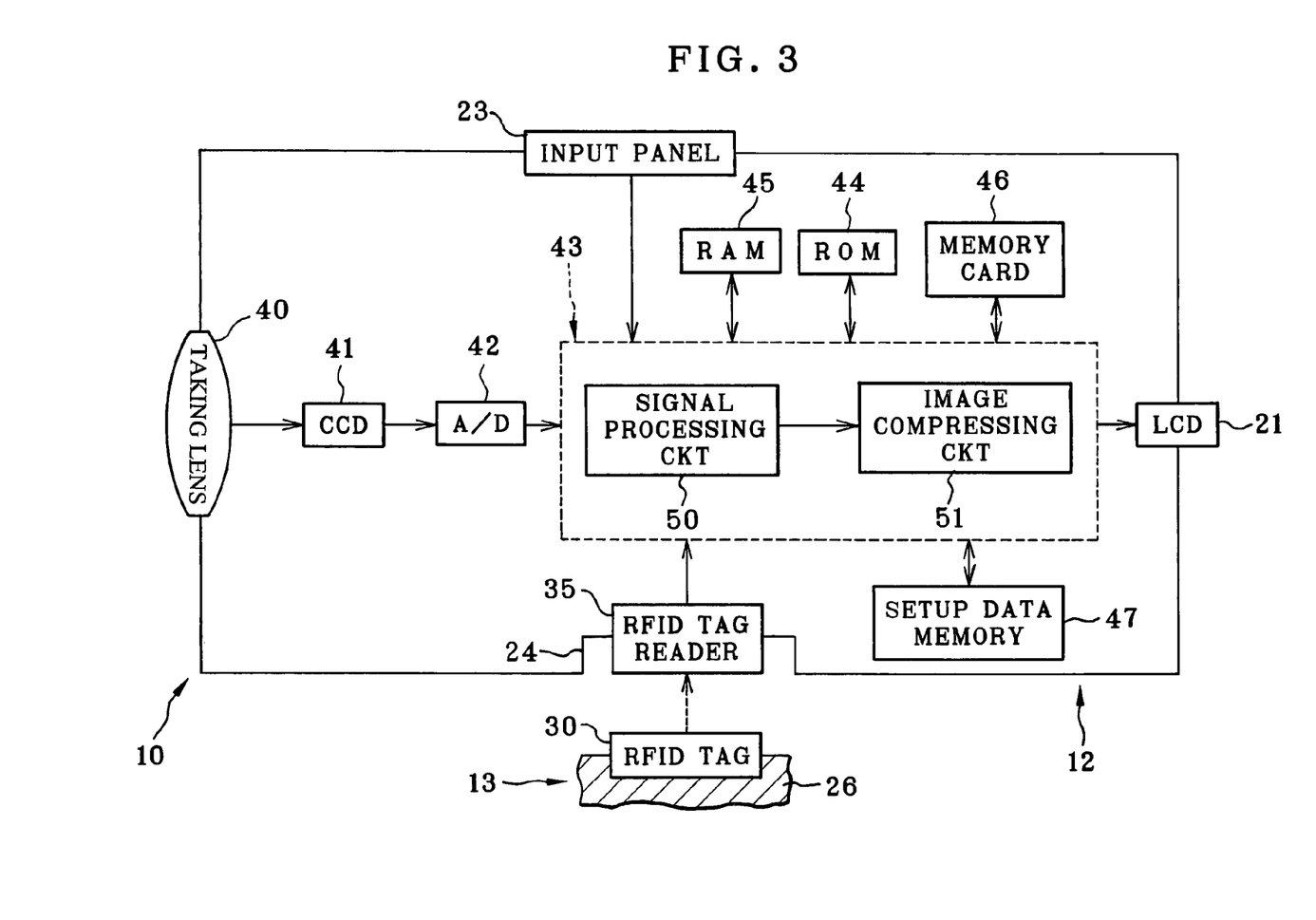
FIG. 3 is a block diagram schematically illustrating circuit arrangement of the setup supporting system.

In FIG. 3, electric arrangement of the setup supporting system 10 is illustrated schematically. The digital still camera 12 includes the LCD 21, the input panel unit 23, and the RFID tag reader 35. In FIG. 3, the digital still camera 12 also has a taking lens 40, a CCD (charge coupled device) 41 as image area sensor, an A/D converter 42, a system controller 43 or display pattern selector, a ROM 44, a RAM 45, a memory card 46, and a setup data memory 47.

The CCD 41 behind the taking lens 40 converts a focused image on its photoreceptor plane into a pickup signal of an analog form upon depression of the shutter release button 20. See FIG. 1. The pickup signal is converted by the A/D converter 42 into digital image data. Note that the image data being output thus is CCD-RAW data constituted by signals of density of R, G and B for respective pixels. When the shutter release button 20 is depressed, the CCD 41 retrieves playback image data for the purpose of automatic playback of an image on the LCD 21 immediately after the pickup, together with the main image data to be recorded to the memory card 46. The playback image data is subjected to image processing in a simple manner by a signal processing circuit 50 to be described later. After the processing, an image is displayed on the LCD 21 for several seconds of the playback.

The controller 43 receives input signals from the input panel unit 23, and controls elements in the digital still camera 12. An image compressing circuit 51 is included in the controller 43 as well as the signal processing circuit 50. The signal processing circuit 50 and the image compressing circuit 51 subject image data of image frames to image correction of various kinds. Also, various elements are connected with the controller 43, including the RFID tag reader 35, ROM 44, RAM 45, the memory card 46 and the setup data memory 47. For the memory card 46, there are a memory interface (IF) and a card slot which are not shown.

ROM 44 stores programs for various controls, and menu pattern data of menu patterns to be displayed on the LCD 21 for setup parameters. The controller 43 reads the programs and the menu pattern data from ROM 44, writes those to RAM 45 as work memory, and executes processes of various sorts. Also, RAM 45 is caused in a temporary manner to store image data of a digital form output by the A/D converter 42.

The digital still camera 12 includes the known structure in which the input panel unit 23 is manually actuated to cause the LCD 21 to display the setup menu pattern 25 by reading from ROM 44. In the present invention, furthermore, the menu title information or mode information is read from the RFID tag 30 of the printed manual document 13, for the LCD 21 to display the setup menu pattern 25 by forcibly driving the LCD 21 according to the mode information. For example, a user desires the date determination. The digital still camera 12 is placed suitably on a date determining page among the document pages or sheets 26. Then the mode information of determining the date is read from the RFID tag 30. The mode information is converted by the A/D converter into a digital form, which is input to the controller 43. The controller 43 evaluates the mode information, and determines that a date determining page among the document pages 26 is open by the user for the date determining process in the printed manual document 13. Also, the controller 43 checks whether the present operation mode of the digital still camera 12 is the setup mode or not, and checks whether a date determining pattern among the plurality of the setup menu patterns 25 is displayed on the LCD 21. If it is determined that the operation mode is now different from the setup mode, then the digital still camera 12 is forcibly caused to set the setup mode in an automated manner. If it is determined that an image or pattern other than the date determining pattern as the setup menu pattern 25 is displayed on the LCD 21, then the LCD 21 is forcibly caused to display the date determining pattern as the setup menu pattern 25. As the changeover of the operation mode and the LCD 21 is automatic, it is possible for the user only to input the date information by following the explained information 27 and the graphic information 29 on the document page 26.

The setup data memory 47 consists of a non-volatile EEPROM (electrically erasable programmable read-only memory), and stores setup data as input by a user at the time of the setup. For example, at the time of date determination, chronological data of date, month and year, and time are written. At the time of setting image quality, process conditioning data are written, the process conditioning data being for image processing and compression for image data. Any data written to the setup data memory 47 keeps stored even when the power source 12 is turned off, unless a user overwrites new data for the data in the setup data memory 47. Thus, it is unnecessary to input the setup data at each time of turning on or off the power source the digital still camera 12.

Image data being read from RAM 45, the signal processing circuit 50 subjects the image data to image processing of various operations, such as white balance correction, gamma-correction, and sharpness correction, and subjects the image data of red (R), green (G) and blue (B) to Y-C processing to obtain brightness data Y and color difference data Cr and Cb. The image compressing circuit 51 subjects the converted image data to image compression according to a predetermined compressing format, for example JPEG (Joint Photographic Experts Group) format. The compressed image data is written to the memory card 46 by way of the memory interface (IF).

Figure 4:
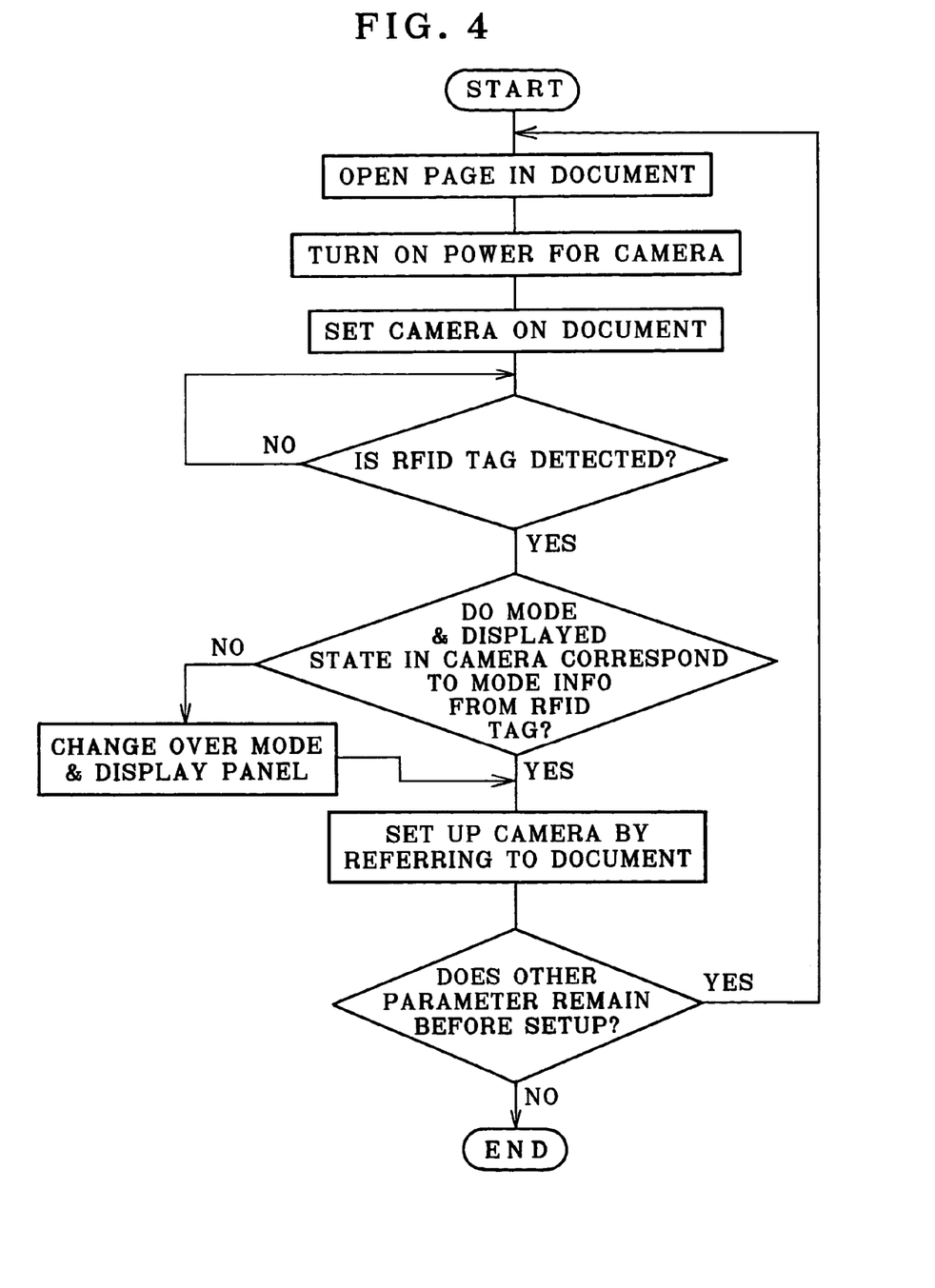
FIG. 4 is a flow chart illustrating a process of setup of the digital still camera.

The operation is described by referring to FIG. 4. To set up the digital still camera 12 for various determinations, one of the document pages or sheets 26 is open in the printed manual document 13 for one of the setup processes. For example, the date determination is effected by opening the date determining page among the document pages 26. Then the power supply for the digital still camera 12 is turned on. The digital still camera 12 is placed on the document page 26 by fitting the reference indicia 37 behind the camera cover 15 at the target indicia 38 of the document page 26, or by positioning inside the positioning region 39. Accordingly, the position of the RFID tag reader 35 inside the tripod connection hole 24 can be set at the RFID tag 30.

The RFID tag 30 is positioned inside a region where communication is possible with the RFID tag reader 35. Then the RFID tag 30 starts being operated by a carrier of radio wave sent by the RFID tag reader 35. The antenna in the RFID tag 30 transmits a radio wave as a wireless signal of the menu title information or mode information for the date determination previously stored in the IC memory chip or identification storage medium. It is possible for the RFID tag reader 35 to read the mode information in the RFID tag 30. The mode information is digitally converted into menu title data or mode data, which is input to the controller 43.

The controller 43 evaluates the menu title data or mode data, and judges that one of the document pages or sheets 26 having description for the date determination is open in front of a user. The controller 43 checks whether the present operation mode of the digital still camera 12 is the setup mode and whether the displayed state of the LCD 21 is the date determining pattern among the setup menu patterns 25. If the controller 43 determines the present operation mode of the digital still camera 12 is other than the setup mode, then the controller 43 changes the operation mode to the setup mode automatically or forcibly. Otherwise, the controller 43 determines that the LCD 21 displays a playback image or any menu pattern other than the date determining pattern among the setup menu patterns 25. Then the controller 43 reads menu pattern data from ROM 44 for the date determination. The image displayed on the LCD 21 is automatically changed over to the date determining pattern among the setup menu patterns 25. Advantages in the automated changes of the operation modes of the digital still camera 12 and the displayed state of the LCD 21 are in easy handling in the setup operation.

When the setup menu pattern 25 for determining the date is displayed on the LCD 21, the user views the setup menu pattern 25 in comparison with the graphic information 29 of the document page 26, and operates the input key 62 to input parameters by following the explained information 27. As the setup menu pattern 25 indicates the same as the explained information 27 and the graphic information 29, even unfamiliar users can determine and input information. This is advantageous for such users as aged persons, unskilled persons and the like. The date information being input is written to the setup data memory 47. When the date determination is completed, it is possible to input image quality information readily. To this end, similar operation can be used in the manner described for the date determination.

In the present embodiment, the RFID tag reader 35 is located inside the tripod connection hole 24. Furthermore, an opening may be formed in any suitable portion of the camera cover 15, so the RFID tag reader 35 can be disposed inside the opening. However, such an opening can be preferably formed in a lower face of the camera cover 15 for the purpose facilitating reading information from the RFID tag 30, even though the RFID tag reader 35 is not disposed in the tripod connection hole 24.

Note that, despite the above construction of the document pages or sheets 26 having the graphic information 29 and the explained information 27, only either one of the graphic information 29 and the explained information 27 may be carried on the document pages 26, specially if the information is very simple. Also, the printed manual document 13 may have any form other than the booklet form, for example, a leaflet formed by folding a single print sheet. For this structure, it is possible to dispose the RFID tag 30 on the relevant portions with description of the determining process in the setup mode. Also, the printed document may be constituted by a set of manual cards.

In the digital still camera 12 of the above, the setup mode is single for setting up the date, image quality and other determining processes. However, two or more setup modes may be selectably predetermined. Those can include a date determining setup mode, an image quality determining setup mode, and the like. For such a construction, the operation mode of the digital still camera 12 can be changed to an associated one of the setup modes according to information related to the setup parameter, such as menu title information or mode information, which is obtained from the RFID tag 30.

In the present embodiment, the parameter determining process of the digital still camera 12 is described. However, the feature of the invention can be used for parameter determining process in any electronic device, such as a cellular phone, PDA (Personal Digital Assistant) and the like, specifically devices having a display panel with which parameters are input. The RFID tag 30 can be secured to the document pages or sheets 26 of the printed manual document 13 with descriptions, and can store information related to the parameter determining process of the document pages 26. The RFID tag reader 35 can be used in the electronic device for reading the information from the RFID tag 30.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A setup supporting system for supporting setup of an electronic device in which plural operation modes are selectively settable, and include a setup mode for plural setup parameters, and which includes a display panel for displaying a setup menu pattern associated with one of said plural setup parameters while said setup mode is set, said setup supporting system comprising:
   a printed document, including information of said setup of said plural setup parameters;
   an RFID tag, secured to said printed document, associated with said setup parameters, for storing mode information of said setup mode;
   an RFID tag reader for reading said mode information from said RFID tag;
   a mode selector for setting said setup mode; and
   a display pattern selector for causing said display panel to display said setup menu pattern associated with said one of said plural setup parameters according to said mode information.

2. A setup supporting system as defined in claim 1, wherein said printed document is a printed manual document associated with said electronic device.

3. A setup supporting system as defined in claim 2, wherein said RFID tag reader is positioned at a lower face of said electronic device.

4. A setup supporting system as defined in claim 1, wherein said electronic device comprises a digital camera;
   said RFID tag reader is disposed inside a tripod connection hole formed in a lower face thereof, and adapted for tripod connection.

5. A setup supporting system as defined in claim 4, further comprising a first indicia, disposed on a lateral face of said digital camera, for designating a position of said RFID tag reader;
   wherein said printed document includes a second indicia adapted to positioning said first indicia with reference thereto.

6. A setup supporting system for supporting setup of an electronic device having a display panel, comprising:
   a mode selector, incorporated in said electronic device, for setting a selected one of plural operation modes, wherein at least one setup mode is included in said operation modes, and said display panel displays a setup menu pattern while said setup mode is set;
   a printed document, having plural document sections, wherein a first document section is included in said document sections, and has said setup menu pattern printed thereon;
   an RFID tag, secured to said printed document, for storing mode information of said setup mode;
   an RFID tag reader, incorporated in said electronic device, for reading said mode information from said RFID tag, to set said setup mode forcibly irrespective of selection of said operation modes in said mode selector;
   an input unit, incorporated in said electronic device, for inputting at least one setup parameter while said setup mode is set.

7. A setup supporting system as defined in claim 6, wherein said document sections comprise document sheets.

8. A setup supporting system as defined in claim 6, wherein said RFID tag reader is disposed on a lower face of said electronic device.

9. A setup supporting system as defined in claim 8, wherein said electronic device comprises a digital camera.

10. A setup supporting system as defined in claim 9, wherein said digital camera includes a tripod connection hole formed in a lower face thereof, said RFID tag reader being disposed inside said tripod connection hole.

11. A setup supporting system as defined in claim 9, further comprising at least one first indicia, disposed on a lateral face of said digital camera, for designating a position of said RFID tag reader.

12. A setup supporting system as defined in claim 11, wherein said first document section further includes a second indicia for positioning said first indicia thereon, to set said RFID tag reader at said RFID tag.

13. A setup supporting system as defined in claim 12, wherein said first document section further includes a positioning region, disposed beside said printed setup menu pattern to extend about said RFID tag, for positioning an outer surface of said digital camera therein.

14. A setup supporting system as defined in claim 13, wherein said second indicia is positioned close to and outside said positioning region.

15. A setup supporting system as defined in claim 14, wherein said printed setup menu pattern includes verbally explained information.

16. A setup supporting system as defined in claim 6, wherein said at least one setup mode includes at least a date determining setup mode and an image quality determining setup mode.

* * * * *